United States Patent [19]

Iizuka et al.

[11] Patent Number: 4,707,083

[45] Date of Patent: Nov. 17, 1987

[54] LENS MOVING DEVICE

[75] Inventors: Toshimi Iizuka, Kanagawa; Shigeru Kamata, Tokyo, both of Japan

[73] Assignee: Canon Kabushiki Kaisha

[21] Appl. No.: 778,381

[22] Filed: Sep. 20, 1985

[30] Foreign Application Priority Data

Sep. 29, 1984 [JP] Japan .............................. 59-146577[U]
Oct. 24, 1984 [JP] Japan .............................. 59-159783[U]
Aug. 28, 1985 [JP] Japan .............................. 60-130941[U]

[51] Int. Cl.$^4$ .................................................. G02B 7/04
[52] U.S. Cl. ..................................... 350/429; 350/255
[58] Field of Search ................ 350/429, 430, 253, 255

[56] References Cited

U.S. PATENT DOCUMENTS 3,957,355  5/1976  Reinsch et al. ...................... 350/430
4,272,160  6/1981  Uesugi ................................. 350/429
4,533,218  8/1985  Nakazato et al. ................... 350/430

Primary Examiner—John K. Corbin
Assistant Examiner—Loha Ben
Attorney, Agent, or Firm—Toren, McGeady & Associates

[57] ABSTRACT

A lens moving device having an axially movable or rotatable sleeve fitted in a fixed sleeve, helix-like camming slot and groove formed respectively through the wall of the movable sleeve and in the inner surface of the fixed sleeve, and a guide pin radially extending from a lens cell into a cross point of the slot and groove, whereby the side edges of each of the helix-like camming slot and groove are made tapered surfaces, and the guide pin in the form of a singlet member or a plurality of concentric members is shaped to a truncated cone in contacting portions with the tapered surfaces of the slot and groove.

9 Claims, 9 Drawing Figures

LENS MOVING DEVICE

BACKGROUND OF THE INVENTION

1. Field of the Invention

This invention relates to lens moving devices for use in focusing or zooming photographic lenses.

2. Description of the Prior Art

There have been known mechanism for transmitting rotative movement of the actuating ring to axial movement of the focusing member or zoom members by using cam sleeves.

Also, many attempts have been made to employ new materials for making up those parts of the lens mounting which are associated with such mechanism. For example, in the past, the main constituent members of the lens mounting, such as the body tube, lens cell, cam sleeve, intermediate or helicoid sleeve, distance adjusting ring and zoom actuator ring were made of metalic materials such as aluminum alloys and brass. Since these metals are very expensive and the machining cost is also high, the sum of the material and machining costs account for a considerably large proportion of the price of the product.

To eliminate the above-described problem of the metallic material, increasing attempts of employing plastic materials in some of the constituent parts of the lens mounting begin to be made. The use of the metallic material and the plastic material in the constituent members of the lens mounting gives rise to bad influences on the optical performance and the mechanical strength, because, as the ambient temperature changes, the difference between the coefficients of linear expansion of both materials takes the form of a discrepancy of the actual value of axial movement of the lens member from the ideal value.

To overcome this problem, there has been a previous proposal for contructing the mechanism in such a way that the side edges of the camming slot are formed to tapered shape, and the cam follower is urged by a spring member to abut on the aforesaid tapered surface in Japanese Laid-Open Utility Model Application No. Sho 57-170873.

This prior known art has, however, the following problem. As the guiding groove of the body tube is crossed over the camming slot of the cam sleeve at a point in which the guide pin on the lens cell is fitted, for the amount (angle) of rotation of the cam sleeve is reduced to effect an equivalent total axial movement of the lens, the guiding groove must be not linear in parallel with the optical axis, but arcuate. For this purpose, if the body tube and the cam sleeve are intended to be made of resin material by molding techniques, the metal mold is required to have undercut portions for the groove and slot of the tube and sleeve. Therefore, (1) The arcuate slot and groove of the molded body tube and cam sleeve are formed unavoidably with gradient walls necessary to allow for the core of the metal mold to be pulled out from the formed piece.

(2) As the thickness of the body tube and the cam sleeve for the ordinary diameter of the lens mounting is about 2 mm, there is a critical condition that the allowable range of radial lengths of the undercut portion be less than 2 mm. This implies that all the thickness cannot be undercut when molding.

For these reasons, with the mechanism having the body tube in which the axially movable or rotatable sleeve is fitted, the movable lens cell fitted in the sleeve, and the guide pin radially extending from the cell through the camming slot of the sleeve, when the side edge of the camming slot is made tapered by undercut molding techniques, a problem is produced that a sufficient strength cannot be obtained due to a limitation on the thickness of the axially movable or rotatable sleeve resulting from the critical condition of the undercut molding.

SUMMARY OF THE INVENTION

A first object of the present invention is to provide a lens mounting structure having a pair of inner and outer tubular members of resin material incorporated therein with respective camming slots, or slot and groove, for controlling the movement of a lens formed by molding techniques, which has overcome the above-described problems of the prior art.

Particularly in application of the invention to the lens moving mechanism having the axially movable or rotatable sleeve fitted in the body tube, both camming slot and groove of the sleeve and tube are provided with tapered side edges, thereby the problems of the prior known barrel structure are solved.

A second object is to provide for the tapered form of both camming slot and groove of the axially movable or rotatable sleeve and the body tube with a novel guide pin engaging in the cross point of the tapered camming slot and groove with an advantage of compensating for the loss of the physical strength so that the flexibility of design of the lens moving device is improved.

BRIEF DESCRIPTION OF THE DRAWINGS

FIG. 1 is an upper half sectional view of a lens mounting mechanism.

FIG. 2 is a sectional view in enlarged scale of a guide pin in engagement with the camming slot and groove.

FIGS. 3 and 4 illustrate two examples of modification of the structure of the guide pin with the cam.

FIG. 5 is a sectional view in enlarged scale of the guide pin in engagement with the camming slot and groove.

FIG. 6 is an upper half sectional view of a lens mounting mechanism.

FIG. 7 illustrates an example of modification of the assembly of the guide pin and the cam.

FIG. 8 is an upper half sectional view of a lens mounting mechanism.

FIG. 9 is a sectional view in enlarged scale of the assembly of the guide pin and cam.

DETAILED DESCRIPTION OF THE PREFERRED EMBODIMENTS

Figure 1:
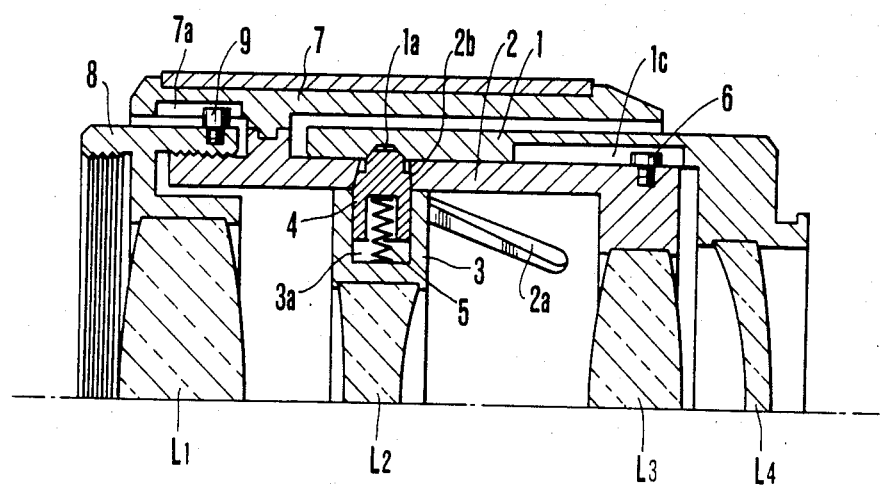
FIGS. 1 to 4 illustrate a first embodiment of a lens moving device according to the present invention, where the guide pin is comprised of only one member.

In FIGS. 1 to 4, there is shown a first embodiment of the invention where a guide pin is made constructed in the form of a singlet and provided with conic surfaces in conformance with the respective tapered side walls of the camming slot and groove.

A body tube 1 fixedly carries a lens component L4 at the rear end thereof and its inner surface has an arcuate camming groove 1a whose side walls 1b make an equal angle θ of opposite sign to each other with an axis of the guide pin 4 so that its width increases as the depth decreases, or the groove 1a, opens wider toward the optical axis, and an axially elongated key groove 1c. A cam sleeve 2 axially movably fitted in the inner diameter of the body tube 1 has a camming slot 2a whose side walls 2b are inclined at an equal angle θ' of opposite sign to each other. A detent screw head 6 on the outer surface of the cam sleeve 2 is just fitted in the key groove 1c of the body tube 1 to allow for axial movement of the cam sleeve 2 while being restrained from rotation about the optical axis. The values of these angles of inclination θ and θ' are related to each other by $\theta > \theta' \geq \theta°$. The cam sleeve 2 fixedly carries a zoom lens component L3 at the rear end thereof and has a movable lens cell 3 for another zoom lens component L2 fitted in the inner diameter thereof. The lens cell 3 has a radial hole 3a in which is fitted the guide pin 4. A coil spring 5 in a bottom axial hole of the guide pin 4 urges the guide pin 4 outward. And the guide pin 4 engages in both of the camming slot 2a and groove 1a at a cross point thereof. Those parts of the guide pin which confront the camming groove 1a and slot 2a are formed to first and second truncated cones 4A and 4B of tip angles equal to 2 times the angles of inclination θ and θ' respectively, and are so radially displaced that when urged by the spring 5, the abutting engagement of the first cone 4A on the inclined side walls 1b of the camming groove 1a of the larger inclination angle θ predominates, while the camming slot 2a of the smaller inclination angle θ' is in broken contact with the second cone 4B by a gap A as if the outer surface of the cam sleeve 2 were floating slightly above the upper plane of the second truncated cone 4B.

An outer barrel 7 as an actuator ring fitted on the outer diameter of the body tube 1 is rotatable relative to the cam sleeve 2 but is drivingly connected thereto in axial directions. A front lens cell 8 is helicoid-threadedly coupled with a front outer surface of the cam sleeve 2 and contains a focusing lens component L1. A drive connection screw head 9 radially extends from the front cell 8 into a longitudinally elongated key groove 7a formed in a front inner surface portion of the actuator ring 7.

The operation of the first embodiment is as follows: At first, when the actuator ring 7 is turned, as this motion is transmitted through the pin 9-and-key groove 7a connection and the helicoid coupling to axially move the front lens cell 8, focusing is performed.

Next, when the actuator 7 is moved axially, the cam sleeve 2 is axially moved by an equal distance to that the actuator 7 has moved, while being restrained from rotation by the pin 6-and-key groove 1c connection. Since, however, the guide pin 4 of the cell 3 engages in the cross point of the camming groove 1a and slot 2a, the first zoom lens component L2 in the cell 3 while being rotated about the optical axis is axially moved in differential relation to the second zoom component L3, thereby the focal length of the photographic objective is varied.

Figure 2:
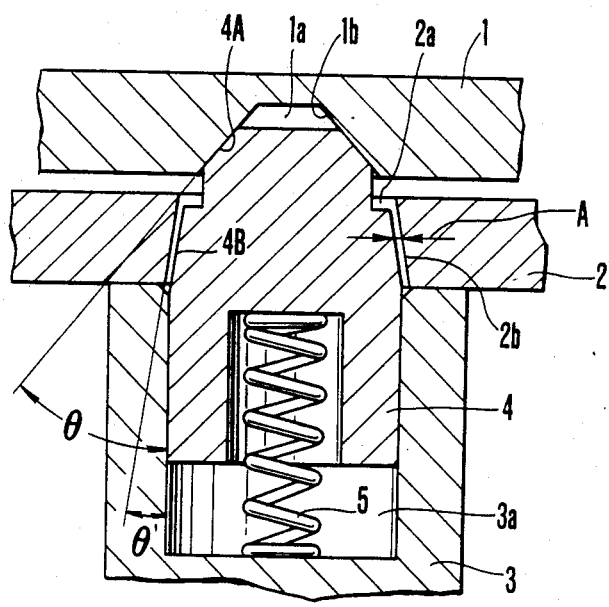

It should now be pointed out that the use of plastic material in making up the body tube 1 and cam sleeve 2 by molding means leads, in the present state of art, to undercut the camming portions. To facilitate removal of the core of the metal mold having an undercutting projection from the formed piece, the side walls of the camming slot or groove must be made slant. Another defect is that the precision accuracy of plastic molding is not so high that the above-described two truncated cones of the guide pin are actually just in contact with both camming slot and groove at a time throughout the entire range of movement. Assuming that whichever first is floated from the guide pin 4, then as shown in FIG. 2, the axial gap A varies as a function of the inclination angle, in this instance, θ' of the camming slot 2a, or is equal to the floating amount of the camming slot 2a multiplied by sin θ. The smaller the inclination angle θ', the shorter the axial gap A. As this inclination angle decreases, however, when the camming slot is in contact with the guide pin, the frictional force of the guide pin on the camming slot is rapidly increased by the wedge effect with the help of the bias spring. But, in the present invention, a relationship of the angles of inclination θ and θ' is set forth as $\theta > \theta' \geq \theta°$, and the first and second cones 4A and 4B of the guide pin are so arranged that the first cone 4A preferentially engages with the camming groove 1a that has so large an angle of inclination θ that the guide pin 4 cannot bite it, while the second cone 4B is put in broken contact with the camming slot 2a that has so small an angle of inclination θ' as not to affect the accuracy of zooming control. Taking a numerical example, for the floating amount of the camming slot 2a at 0.05 mm and θ'=10°, the axial gap is found to be 0.05 x sin 10° ≈0.009 mm. In actual practice, this error may be neglected.

Figure 3:
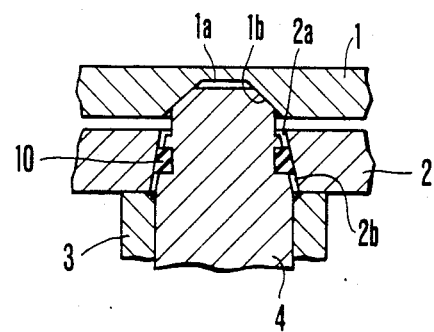

To prevent this error from being doubled in value, use may be made of gap absorbing means in the form of an elastic ring 10 in an outer circumferential recess at the center of length of the second cone 4B of the guide pin 4 as shown in FIG. 3.

Figure 4:
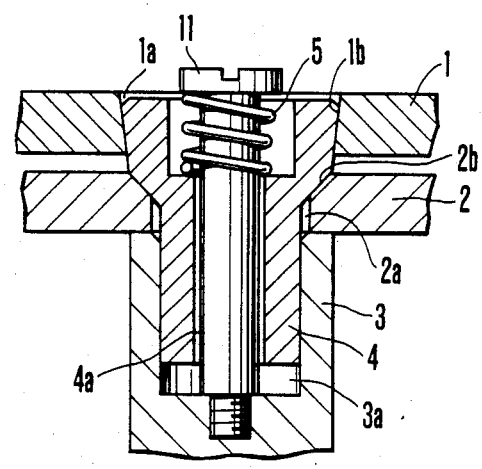

FIG. 4 illustrates an example of variation of the lens moving device of FIGS. 1 and 2 where the body tube 1 is provided with a camming slot 1a, and the angles of inclination of the camming slots 1a and 2a are equal to those obtained by interchanging those shown in FIGS. 1 and 2 and are reversed in its orientation. Namely, the side walls 1b of the camming slot 1a are inclined to the angle θ', and the side walls 2b of the camming slot 2a to the angle θ, and their slot widths both increase as the radial distance increases toward the outside. Meanwhile, a guide pin 4 has a cylindrical body fitted in an outwardly open radial hole 3a of the movable lens cell 3 and a head which is formed with a continuous succession of concentric two truncated cones of tip angles equal to 2 times the angles of inclination θ' and θ respectively. Further, the guide pin 4 is hollowed at a core 4a through which a shaft 11 extends to be screwed in the movable lens cell 3. A compression spring 5 lies between an upper flange of the shaft 11 and a shoulder of an over-bored portion of the guide pin 4, urging the guide pin 4 toward the optical axis until its lower cone abuts on the inclined side walls of the camming slot 2a.

By such changes of the construction and arrangement of the elements, though the functions are left unchanged from those of FIGS. 1 and 2, when in application to making up the camming slots by molding means, an advantage is produced that particularly the complexity of structure of the mold can be very reduced.

Figure 5:
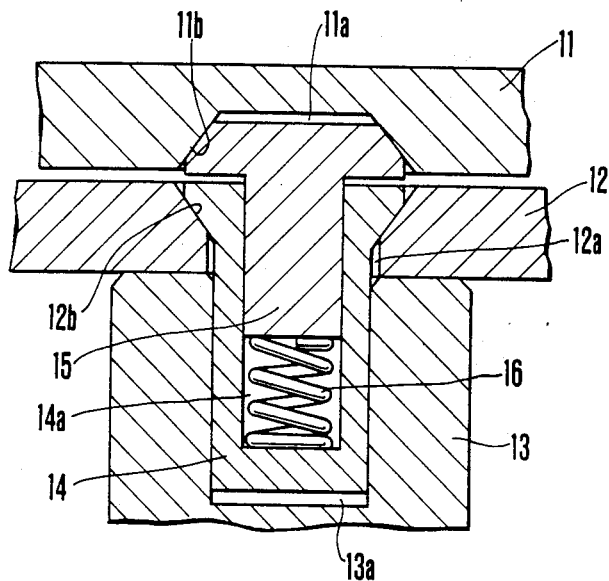
FIGS. 5 to 7 illustrate a second embodiment of the lens moving device according to the invention where the guide pin is comprised of two members.
Figure 6:
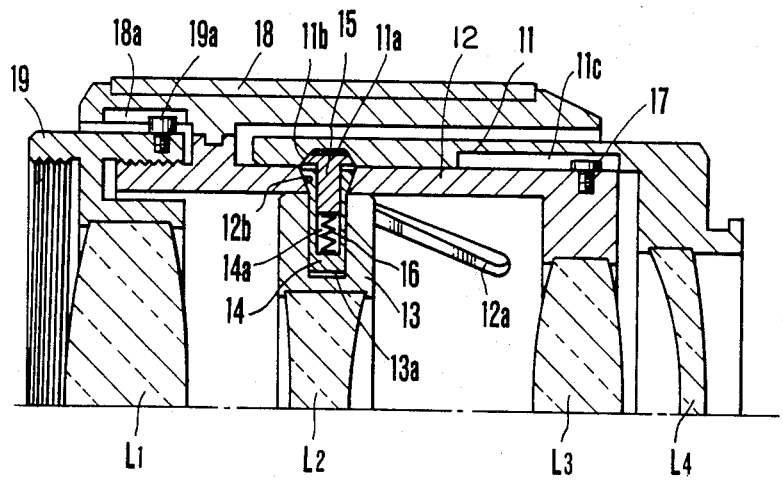
Figure 7:
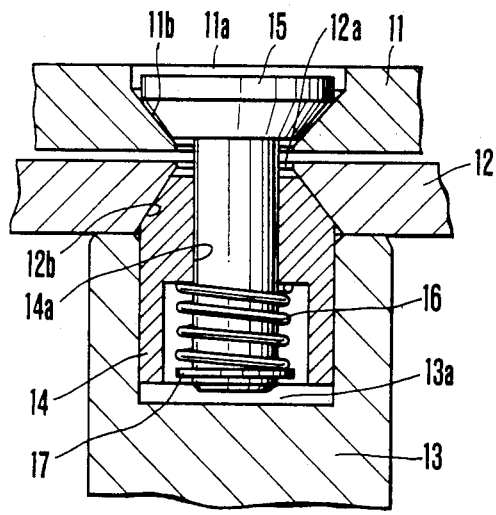

In FIGS. 5 to 7 there is shown a second embodiment where the guide pin is formed with two elements movable relative to each other to provide assurance that both truncated cones on the respective elements can operate with the tapered camming slot and groove of both barrel members throughout the entire range of movement.

A camming groove 11a formed in the inner surface of a body tube 11 crosses over a camming slot 12a formed through the wall of a cam sleeve 12 fitted in the inner diameter of the body tube 11 at a point in which lies an assembly of concentric guide pin elements 14 and 15 redially extending outwardly of a movable lens cell 13. The camming groove 11a and slot 12a are formed with inclined side walls 11b and 12b of which the front or rear ones have angles of inclination of opposite sign to each other, and the guide pin elements 14 and 15 engage the camming slot 12a and groove 11a respectively. The heads of the guide pin elements 14 and 15 are formed to truncated cones of tip angles equal to double the angles of inclination of the camming slot 12a and groove 11a respectively. A spring 16 between the two guide pin elements 14 and 15 urges both of the cones to effective abutting engagement on the inclined side walls 12b and 11b respectively.

When plastic material is used for molding each of the camming groove 11a and slot 12a of the body tube 11 and cam sleeve 12, it is in the present state of art that the camming surfaces unavoidably take appreciable angles of inclination. Also when the lens moving device is of the cam type as is usual in the art, it is necessary to use two camming slots of different orientation from each other to the optical axis. If the guide pin is in the form of a single element, it is very difficult to realize effective engagement of both truncated cones of the guide pin with the inclined camming surfaces of both barrel members throughout the entire range of zooming movement, because the precision accuracy of plastic molding techniques of today is not so much high. According to this embodiment of the invention, therefore, use is made of two guide pin elements 14 and 15 arranged in concentric relation and having their truncated conic heads opposed to each other so that one compression spring 16 suffices for simultaneous effective engagement of the guide pin elements 14 and 15 with the inclined camming surfaces of the slot 12a and groove 11a respectively. With this, the deviations of the actual values of design parameters such as the curvature and width of the camming slot and groove and the roundness of the molded plastic body tube and cam sleeve from the ideal ones and the change of their dimensions due to the change of ambient temperature can be absorbed to insure that the conic heads of the guide pin elements 14 and 15 are maintained just in contact with the camming slot 12a and groove 11a at any station of movement.

FIG. 6 shows an example of application of the lens moving device of FIG. 5 to a mechanical mounting for a zoom lens. The body tube 11 fixedly carries a relay lens L4 at the rear end thereof, and is provided with the camming groove 11a formed in the inner surface thereof and having side walls 11b inclined to open wider toward the inside and a key groove 11c parallel to the optical axis. The cam sleeve 12 is fitted in the inner diameter of the body tube 11 and is provided with camming slot 12a having the outward open inclined side walls 12b. A detent pin 17 screw-threadedly planted on the outer surface of the cam sleeve 12 is just fitted in the key groove 11c of the body tube 11 to restrain the cam sleeve 12 from rotation while being permitted to axially move. Further, the cam sleeve 12 fixedly carries a zoom lens component L3 at the rear end thereof, and movably carries a lens cell 13 for another zoom lens component L2 in the fitted inner diameter thereof. The movable lens cell 13 is provided with a radial hole 13a in the outer surface thereof in which is movably fitted the first guide pin element 14. After a coil spring 16 is installed within a hole 14a bored in that element 14 with its center at the axis of the element 14, the second guide pin element 15 is concentrically fitted thereto, so that the first and second guide pin elements 14 and 15 repel each other to bring their conic heads into abutting engagement with the inclined camming surfaces of the slot 12a and groove 11a respectively. When the cam sleeve 12 moves axially, the cross point of the camming slot 12a and groove 11a at which the guide pin elements 14 and 15 engage them is moved axially with variation of the air separation between the two zoom components L2 and L3.

An actuator ring 18 is fitted on the outer surface of the body tube 11, being rotatable relative to the cam sleeve 12 but being restrained from axial movement relative thereto. A front lens cell 19 containing a focusing component L1 is helicoid-threadedly coupled with a front portion of the outer surface of the cam sleeve 12 and has a radial pin 19a on the outer surface thereof. This pin 19a extends into, and is just fitted in, a key groove 18a formed in the inner surface of the actuator ring 18. When the actuator ring 18 is turned, the front cell 19 is turned through the drive connection pin 19a, while such rotative movement of the cell 19 is transmitted by the helicoid coupling with the cam sleeve 12 to axial movement thereof, thereby focusing is performed.

FIG. 7 shows an example of variation of the second embodiment where the inclination of each of the camming surfaces of the slot 12a and groove 11a of FIG. 6 is reversed, and the groove 11a is changed to a slot. That is, the body tube 11 is provided with a camming slot 11a having side walls 11b inclined to face outward, and the cam sleeve 12 is provided with a camming slot 12a having side walls 12b inclined to face inward. Meanwhile, a first guide pin element 14 fitted in the hole 13a of the movable lens cell 13 is formed to a truncated cone at the top end portion thereof in conformance with the inclined side walls of the camming slot 12a and has a central penetration hole 14a in which is concentrically fitted a second guide pin element 15 whose head is conformed to the inclined side walls of the camming slot 11a. A coil spring 16 between a letter "C" shaped ring 17 on the bottom end of the guide pin element 15 and a shoulder of an over-bored hole in the first guide pin element 14 urges the heads of the first and second guide pin elements 14 and 15 to attract each other across the camming slots 11a and 12a.

Figure 8:
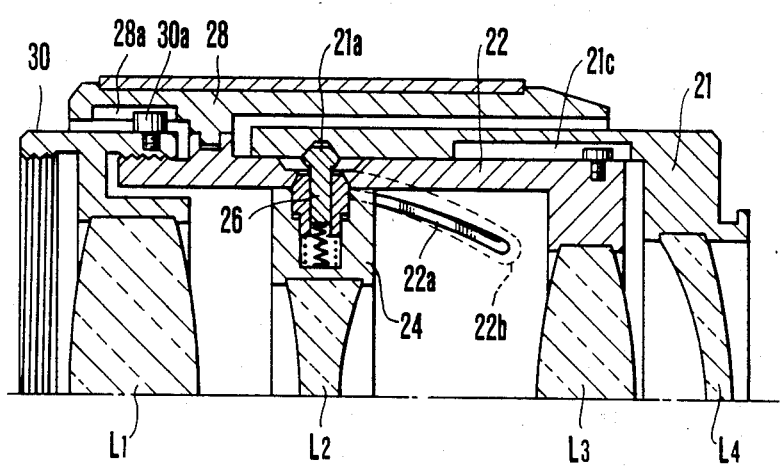
FIGS. 8 and 9 illustrate a third embodiment of the lens moving device according to the present invention where as the barrel members are formed of resin material by molding techniques, an undercut countermeasure is considered.
Figure 9:
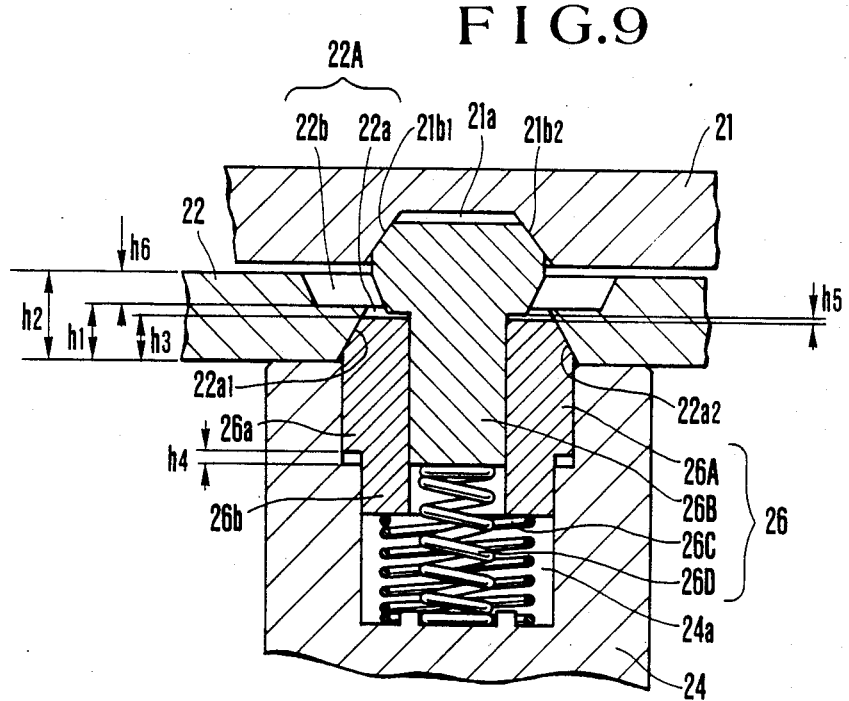

FIG. 8 is an upper half sectional view of a third embodiment of the lens moving device according to the present invention, and FIG. 9 is a sectional view in enlarged scale of its main parts.

A reference numeral 21 is a body tube holding a lens L4 at its rear end portion and provided with a helical guide groove 21a in its inner surface. The side surface of said guide groove 21a are made tapered surfaces 21b1 and 21b2 of sector shape toward the inner diameter direction thereof.

21c is a straight groove for guiding a straight moving sleeve 22 to be described later.

The straight moving sleeve 22 is fitted in the inner surface of the body tube 21 and its inside has a fitted lens moving frame 24 holding a lens L2.

The outer periphery of the lens moving frame 24 is provided with a hole 24a accommodating guide means 26 to be described later. In this hole 24a are contained a first guide pin 26A, a second guide pin 26B and springs 26C and 26D urging the respective guide pins 26A and 26B.

22A is a camming slot formed in the straight moving sleeve 22, said camming slot 22A comprising a cam 22a nearer to the inner surface of the straight moving sleeve 22 for engagement with the first guide pin 26A, and a groove 22b above said cam 22a having a larger width than the diameter of the second guide pin 26B.

The cam 22a has its side surfaces made tapered surfaces 22a1 and 22a2, and this taper cam 22a is made up of resin material by undercut molding techniques. The groove depth h1 of the camming groove of this taper cam 22a is made a possible depth of the undercut molding. This groove depth h1 is about 1.2 mm when the straight moving sleeve 22 has a thickness h2 of about 2 mm.

Therefore, the groove depth h6 of the upper groove 22b of the taper cam 22a becomes about 0.8 mm. The first guide pin 26A has its head made a truncated cone so as to engage with the tapered surfaces 22a1 and 22a2 of the taper cam 22a and its body made comprise a large diameter portion 26a and a small diameter portion 26b, these diameter portions 26a and 26b being fitted in respective large and small diameter portions of the hole 24a of the lens moving frame 24, and the bottom surface of the small diameter portion 26b being urged by the first coil spring 26C so that the conically inclined surface of the guide pin 26A is pressed against the tapered surfaces 22a1 and 22a2 of the taper cam 22a. The small diameter portion 26b of the first guide pin 26A under the pressed condition by the spring 26C floats up by a distance h4 from the small diameter portion of the hole 24a of the lens moving frame 24.

The second guide pin 26B is fitted in a central hole of the first guide pin 26A, its head being made a truncated cone, and is urged by the second spring 26D to that the conic surface engages with the tapered surfaces 21b1 and 21b2 of the taper cam 21a of the body tube 21.

The aforesaid straight moving sleeve 22 is arranged to be rotatable relative to an operating ring 28 arranged on the outside of the body tube 21 and to move straight together with it in axial directions.

30 is a front portion sleeve containing a focusing lens L1 which sleeve is helicoid-coupled with the straight moving sleeve 22 and is connected to the operating ring 28 through a straight groove 28a and a pin 30a.

Next description is made about the operation of the lens assembly of FIGS. 8 and 9 according to the aforesaid third embodiment. When the operating ring 28 is turned about the optical axis, by the coupling relationship of the straight groove 28a and the pin 30a, the front portion sleeve 30 is moved forward or rearward by the helicoid coupling with the straight moving sleeve 22 and the focusing function is performed by the lens L1. When the operating ring 28 is operated straight to a direction parallel with the optical axis, the straight moving sleeve 22 moves straight along therewith.

When to move straight the sleeve 22, a large force necessary for the first guide pin 26A to start to move in the cam 22a acts on the truncated cone of the first guide pin 26A through the tapered surfaces 22a1 and 22a2 of the cam 22a, thereby the first guide pin 26A is displaced toward the axis of the pin, that is, downward against the spring 26C. In this embodiment, the first guide pin 26A is set to float above the engaging portion of the small diameter portion of the accommodating hole 24a for the guide pin by the distance h4. Therefore, for the large force at the time of start of movement, the above-described downward movement of the guide pin 26A stops at the aforesaid engaging portion. Also, this distance h4 the guide pin 26A can displace is set smaller than the groove depth h3 of the tapered portion of the cam 22a to prevent the first guide pin 26A from going out of the taper cam 22a.

When in straight movement of the straight moving sleeve 22, a force acts on the second guide pin 26B through the first guide pin 26A. Another force is sometimes given to the second guide pin 26B from the body tube 21 when the lens assembly receives a shock from the outside. In this embodiment, however, there is created a space of distance h5 in the axis of the first and second guide pins 26A and 26B. When the shock is given to the second guide pin 26B, therefore, it is absorbed as the second guide pin 26B moves downward against the spring 26D within the aforesaid distance h5 or after having moved over the aforesaid distance h5 strikes the first guide pin 26A.

The present invention has, as has been described above, an advantage that the main constituent parts of the lens moving device for use in focusing or zooming a photographic objective can be made up of plastic by molding techniques without reducing the accuracy of focusing or zooming control at a remarkably lowered cost.

Particularly in the first embodiment of FIGS. 1 to 4, due to the use of the single form of the guide pin 4 for arranging the first and second inclined surfaces 4A and 4B, the structure of construction is simplified, and an improvement of the accuracy of lens movement can be achieved.

Further, by setting forth the above-described relationship for the angles of inclination of the first and second engaging surfaces 4A and 4B, the guide pin 4 is prevented from biting the camming slot 2a to realize a lens assembly capable of smooth operation.

Also, in the second embodiment of FIGS. 5 to 7, the guide pins are provided in separation so as to engage with the respective tapered camming slots independently of each other, thereby giving an advantage that the smoothness of lens movement can be improved.

Furthermore, according to the third embodiment of FIGS. 8 and 9, when the members constituting part of the lens assembly, namely, the body tube and the axially movable sleeve, are made of plastic material by molding means, for the cam for controlling the movement of the lens is formed to a tapered shape, the situation of impossibility to manufacture due to the limitation on the depth of the camming groove of the tapered form owing to the undercutting can be avoided, thereby the thickness of the sleeve member may be increased to increase the strength.

Further by avoiding exertion of an excessive force on the guide pin due to the shock from the outside, or the overload power at the time of start of movement, the lens moving device can be protected against damages.

What is claimed is:

1. A lens moving device comprising:
 (a) a lens having a zooming function, and a lens holding member containing said lens;
 (b) a body tube having a guide groove for guiding said lens holding member, the side surfaces of said guide grooves being made tapered surfaces;
 (c) an axially movable sleeve fitted in said body tube and arranged to move axially along an optical axis by an external force, said axially movable sleeve having a camming slot to cross said guide groove and the side surfaces of said camming slot being made tapered surfaces; and (d) cam follower means including a cam follower member fixedly secured to said lens holding member and a spring member, said cam follower member being provided with first and second inclined portions abutting respectively on the tapered surfaces of said guide groove and said camming slot, and said spring member being arranged to urge said first inclined portion to be pressed against the tapered surfaces of said guide groove, and said second inclined portion to be pressed against the tapered surface of said camming slot.

2. A lens moving device according to claim 1, wherein the tapered surfaces of said guide groove are made to face at the same direction as that at which the tapered surfaces of said camming slot face.

3. A lens moving device according to claim 2, wherein a taper angle θ1 of the tapered surfaces of said body tube and a taper angle θ2 of the tapered surfaces of said axially movable sleeve are related so that the taper angle of the axially movable sleeve is made larger than the taper angle of the body tube.

4. A lens moving device according to claim 1, wherein the direction of tapering of the tapered surfaces of said guide groove and the direction of tapering of the tapered surfaces of said camming slot are formed so as to be opposite to each other.

5. A lens moving device comprising:
(a) a lens for performing zooming, and a member for holding said lens;
(b) a body tube having a groove for guiding said lens holding member, the side surfaces of said guide groove being made tapered;
(c) an axially movable sleeve fitted in said body tube and arranged to move axially along an optical axis by an external force, said axially movable sleeve having a camming slot to cross said guide groove, and the side surfaces of said camming slot being made tapered in a reversed direction to that of the tapered side surfaces of said guide groove; and
(d) cam follower means including a first cam follower member having an inclined surface in abutting engagement on the tapered surfaces of said camming slot, a second cam follower member having an inclined surface in abutting engagement on the tapered side surfaces of said guide groove, and a spring member urging said first and said second cam follower members to be pressed against the respective tapered surfaces.

6. A lens moving device according to claim 5, wherein the tapered surfaces of said guide groove go wider toward the optical axis of the lens moving device, and the tapered surfaces of said camming slot go wider away from the optical axis of the lens moving device.

7. A lens moving device according to claim 5, wherein the tapered surfaces of said guide groove go wider away from the optical axis of the lens moving device, and the tapered surfaces of said camming slot go wider toward the optical axis of the lens moving device.

8. A lens moving device comprising:
(a) a lens for performing zooming function, and a member for holding said lens;
(b) a body tube having a groove for guiding said lens holding member, the side edges of said guide groove being made tapered in a direction to go wider toward the optical axis of the lens moving device;
(c) an axially movable sleeve fitted in said body tube and arranged to move axially along an optical axis by an external force, said axially movable sleeve having a camming slot to cross said guide groove, the side edges of a radial lower half of said camming slot being made tapered so as to go wider toward the optical axis of the lens moving device, and the radial upper half being made a groove portion of a wider width than that of a lower tapered groove; and
(d) cam follower means including as first cam follower fitted in said lens holding member, a second cam follower fitted in said first cam follower, and first and second spring members urging said first and second cam followers to be pressed against said tapered surfaces, said first cam follower being provided with an inclined surface at the upper periphery thereof in engagement with said lower tapered groove of said axially movable sleeve and with a hole formed at the center thereof in which said second cam follower is fitted, said second cam follower being fitted in said hole of said first cam follower, having its head projected from said first cam follower, and said head being provided with an inclined surface at the upper periphery thereof in engagement with the tapered surfaces of said guide groove, said first and said second spring members being helical springs of large and small diameters respectively, said small diameter spring being put into the inside of said large diameter spring, said large diameter spring urging said first cam follower, and said small diameter spring urging said second cam follower.

9. A lens moving device according to claim 8, wherein the taper angle of the tapered surfaces of said camming slot is smaller than the taper angle of the tapered surfaces of said guide groove.

* * * * *